(12) United States Patent
Crowe et al.

(10) Patent No.: US 10,666,065 B2
(45) Date of Patent: May 26, 2020

(54) REGULATING BATTERY CELLS

(71) Applicant: Lenovo (Singapore) Pte. Ltd., Singapore (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Oxford, NC (US); Amy L. Rose, Chapel Hill, NC (US); Bryan L. Young, Tualatin, OR (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 364 days.

(21) Appl. No.: 15/473,191

(22) Filed: Mar. 29, 2017

(65) Prior Publication Data
US 2018/0287397 A1    Oct. 4, 2018

(51) Int. Cl.
*H02J 7/00* (2006.01)
*H01M 10/42* (2006.01)
*H01M 10/48* (2006.01)
*H01M 10/44* (2006.01)
*H01M 10/052* (2010.01)

(52) U.S. Cl.
CPC ........ *H02J 7/0016* (2013.01); *H01M 10/425* (2013.01); *H02J 7/008* (2013.01); *H02J 7/0063* (2013.01); *H01M 10/052* (2013.01); *H01M 10/441* (2013.01); *H01M 10/482* (2013.01); *H01M 2010/4271* (2013.01); *H01M 2010/4278* (2013.01)

(58) Field of Classification Search
CPC .................................................... H02J 7/0016
USPC ............................................................. 320/134
See application file for complete search history.

(56) References Cited

U.S. PATENT DOCUMENTS

| | | | | |
|---|---|---|---|---|
| 7,825,629 B2* | 11/2010 | Studyvin | ............... | H02J 7/0016 320/116 |
| 7,990,101 B2* | 8/2011 | Hoff | ...................... | H01M 2/105 320/107 |
| 2012/0043818 A1* | 2/2012 | Stratakos | ................ | H02J 3/383 307/77 |
| 2015/0042285 A1* | 2/2015 | Doerndorfer | ....... | H01M 2/1077 320/127 |
| 2017/0141598 A1* | 5/2017 | Desbois-Renaudin | | ...................... B60L 58/19 |
| 2018/0019678 A1* | 1/2018 | Radic | ...................... | H02M 1/08 |
| 2018/0123233 A1* | 5/2018 | Bourilkov | ................ | H01Q 5/50 |

* cited by examiner

*Primary Examiner* — Jerry D Robbins
(74) *Attorney, Agent, or Firm* — Van Leeuwen & Van Leeuwen; Jason A. Friday

(57) ABSTRACT

An approach is provided that determines that power from at least one battery cell in a multi-battery cell configuration is not required to power the device based on a power requirement of the device. The approach then regulates voltages from the battery cells so that first set of the battery cells is shunted (0 v) and a second set of the battery cells is regulated with the voltage being set to one or more voltage levels to satisfy the power requirement.

19 Claims, 6 Drawing Sheets

REGULATING BATTERY CELLS

BACKGROUND

In multi-battery configurations using traditional systems, the batteries in the systems dynamically switch voltages in order to maintain balance amongst the individual cells. This can be problematic when the batteries have unequal charges as a lower charged battery might discharge completely and the remaining battery, or batteries, might not be able to supply sufficient power to the device. Because of the switching to attempt to maintain balance, the device may lack sufficient power even though the remaining (charged) batteries have enough power for the device but is trying to draw an equal amount of charge from the drained battery.

SUMMARY

An approach is provided that determines that power from at least one battery cell in a multi-battery cell configuration is not required to power the device based on a power requirement of the device. The approach then regulates voltages from the battery cells so that first set of the battery cells is shunted (0 v) and a second set of the battery cells is regulated with the voltage being set to one or more voltage levels to satisfy the power requirement.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
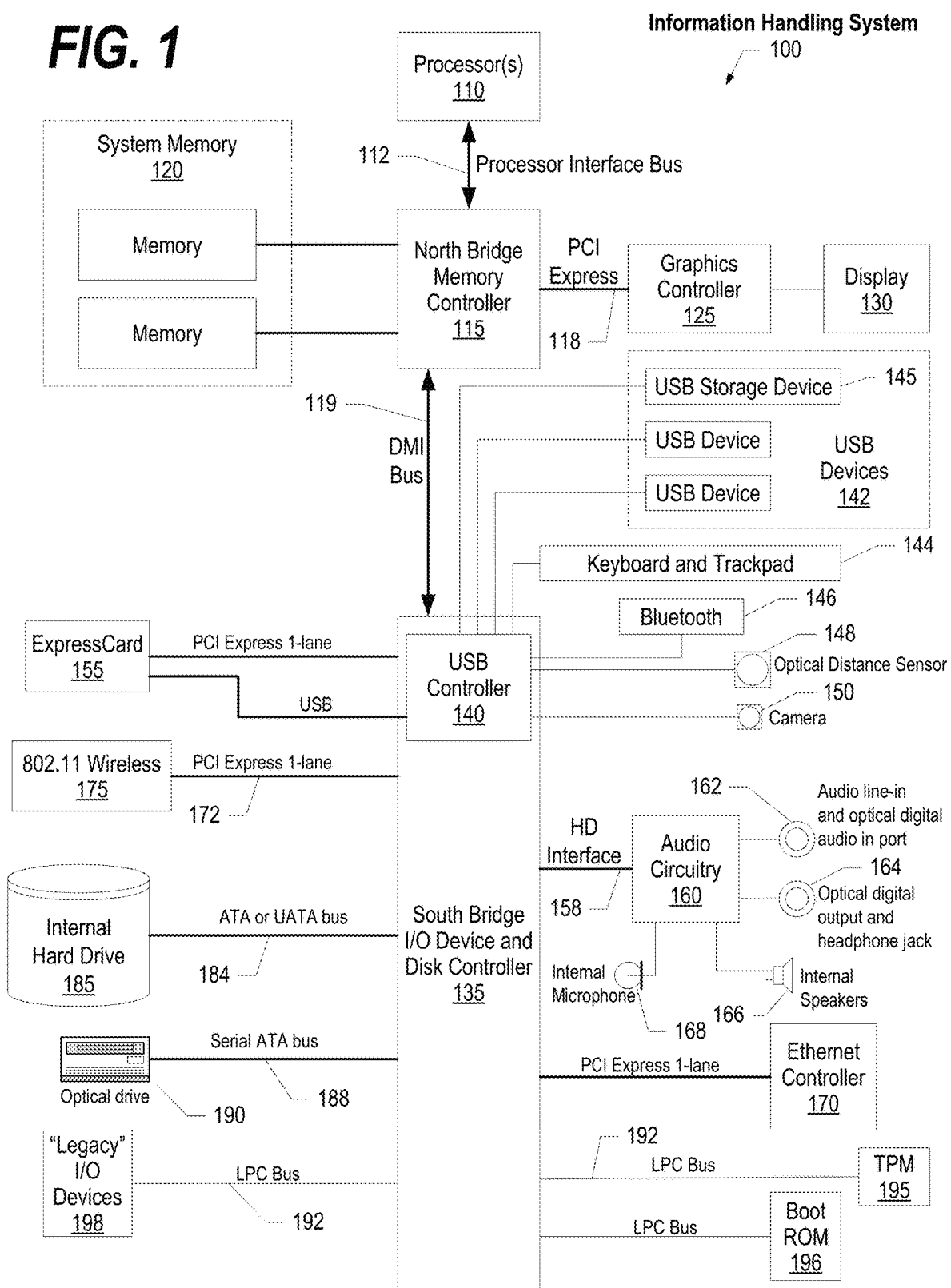
FIG. 1 is a block diagram of a data processing system in which the methods described herein can be implemented.

An approach is depicted in FIGS. 1-6 that shows a smart battery system that optimizes battery performance in a multi-battery cell device. The approach uses the native voltage available at each individual cell and is able to shunt (turn off) power received from one or more of the cells when the other batteries have sufficient power for the device. In one embodiment, the system periodically switches the batteries that are currently being used with batteries that were being shunted. In a lithium-based battery, the native voltage in one cell might be 3.3 v or even 3.7 v for a battery that is labeled as being a 3.0 v battery. If two 3.0 lithium-based batteries are used in a device that requires 3.0 v of power, then one of the lithium-based batteries can be used for a period of time to power the device while the other battery is shunted. The battery that is being used can be voltage-regulated to the proper voltage, in this case 3.0 v from either 3.3 v or 3.7 v, depending on the lithium-based technology being used in the battery.

After the period of time has elapsed, the battery that was shunted is activated to power the device and voltage regulated from its native 3.3 v or 3.7 v down to 3.0 v needed to power the device, while the other battery that was active is shunted. This approach will also work with systems with more than two cell configurations (e.g., four cell battery packs, six cell battery packs, etc.). In one embodiment, one of the cells is chosen to be the cell manager with this cell manager being responsible for waking up shunted batteries, instructing active batteries regarding the voltage regulation value the active batteries are to use, and also to select a new cell manager when the current cell manager is shunted. When active, the cell manager cell also provides power to the device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Logic as used herein include actions and self-contained sequence of actions to be performed by digital circuits characterized by the technology underlying its logic gates as well as by one or more processors programmed to execute instructions that perform such actions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
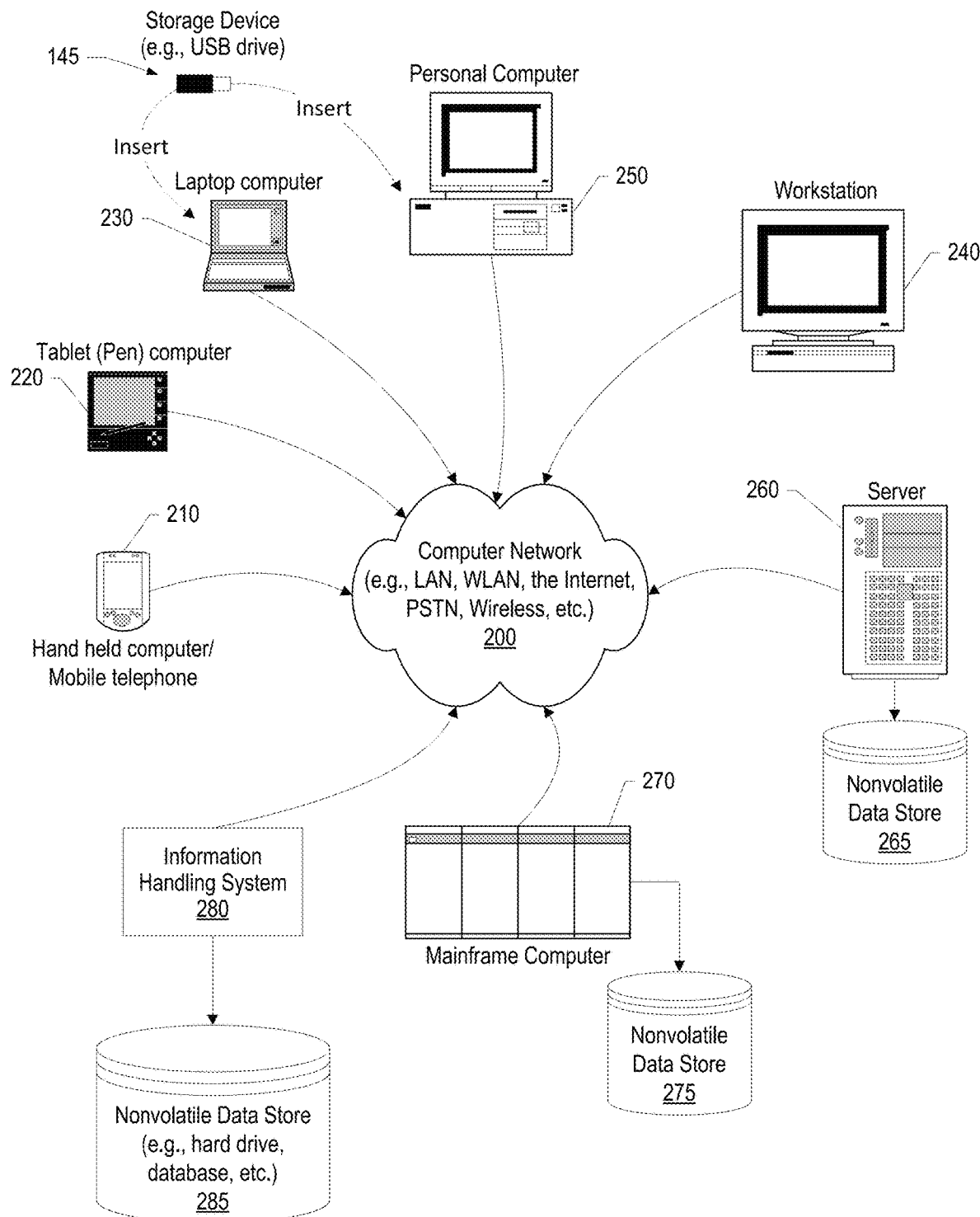
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include digital camera 150, optical distance sensor 148, keyboard and trackpad 144, and Bluetooth device 146, which provides for wireless personal area networks (PANs). Optical distance sensor 148 can detect the distance from a device to various objects, such as users of the system, while digital camera 150 can be used to capture images of objects, such as users of the system, to enable recognition software, such as facial recognition software, to identify the users of the system. USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
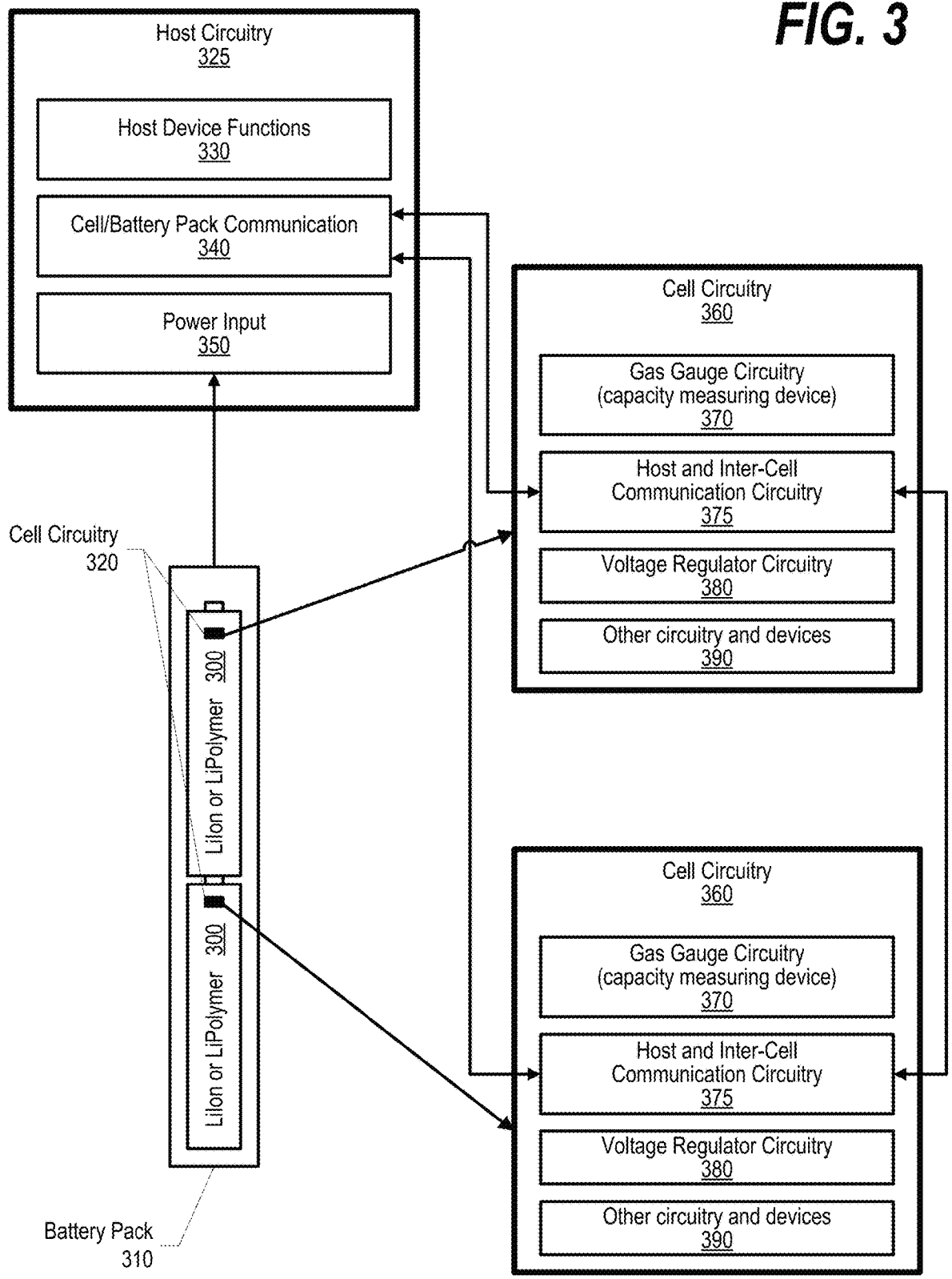
FIG. 3 is a diagram depicting a multi-cell battery pack where the system does not require each battery to be maintained at the same voltage level.

FIG. 3 is a diagram depicting a multi-cell battery pack where the system does not require each battery to be maintained at the same voltage level. Battery cells 300 are included in battery pack 310 and used to provide power to a device that has host circuitry designed to utilize the power provided by the battery pack. Battery cells 300 include cell circuitry as well as an electrochemical unit that includes positive and negative electrodes, and a separator that separates the negative charged electrolyte from the negative charged electrolyte. The electrolyte provides a conductive medium for lithium ions to move between the electrodes. When the cell is being used to power the device, the cell is said to be "discharging," with the positive lithium ions moving from the negative electrode to the positive electrode. During charging, the reverse occurs with the ions moving from the positive electrode back to the negative electrode.

Battery pack 310 is one example of a multi-battery cell configuration. In intelligent battery cells, such as found in many lithium-based batteries (e.g., Li/Ion, Li/Poly, Li/metal, etc.) the individual battery cells include cell circuitry 320. Some of the functions provided by cell circuitry are shown in expanded cell circuitry diagram 360. Cell circuitry can include gas gauge circuitry 370 that is a capacity measuring device that is used to determine the capacity of the individual battery cells, such as the amount of available power that can be provided by the cell. Cell circuitry also includes host and inter-cell communications circuitry 375 that is used to communicate with other cells included in the multi-battery cell configuration. Cell circuitry further includes voltage regulator circuitry 380 that controls the amount of voltage output by the cells, and other circuitry used to operate the intelligent battery cell.

The approach uses a special LiIon/LiPo battery designed to deliver the right voltage and work in conjunction with other batteries to deliver the optimal voltage and extend the battery life to a maximum. For example, in a common case where the device requires 3.0 v of power to operate, the default voltage delivered would be 1.5 v from each battery, as the battery would need to conform to standard dry cell specifications when used alone (single cell application). To deliver 1.5 v from a 3.3 v or 3.7 v battery can be achieved from a basic voltage regulating circuit 380. When multiple cells are used, as shown in FIG. 3, the batteries see their greatest potential. The batteries can switch between three modes: shunted, 1.5 v and 3 v modes. In the case of a 2-cell configuration one cell would be operating at 3 v and the other in a pass-through configuration to provide the required 3 v. The native voltage of many lithium-based batteries is either 3.7 v or 3.3 v. In this case, the two batteries switch back and forth between modes to balance the usage of the two cells. This rotation of configuration would expand amongst the cells in multi-cell configurations. Communication between the cells using communication circuitry 375 can be done in a number of ways, mostly based on minimal AC carrier waves on top of the DC, somewhat like a ripple current. Because the amount of data is minimal, the AC signal could be below 20 Hz, reducing the likelihood of interference.

Host circuitry 325 includes host device functions 330, such as a game or other function desired by the user of the device. Host circuitry 325 can also include communication circuitry that can communicate directly with the cell circuitry included in each of the battery cells. If the host circuitry does not include cell communication circuitry, then the intelligent cells can communicate amongst themselves to output the needed amount of voltage from each of the battery cells. Power input 350 is included in host circuitry 325 and receives direct current (DC) power from multi-battery cell configuration 310. The amount of power needed by the device can be used by cell circuitry included in the battery cells to determine the amount of voltage to be output from the various battery cells included in multi-battery cell configuration 310. In one embodiment, battery cells 300 are single cells and enclosed in cylindrical packages and are sized according to standard and pseudo-standard battery package cells such as "AA," "AAA," "C," "D," and the like, referred to herein as "standard sized packages."

Figure 4:
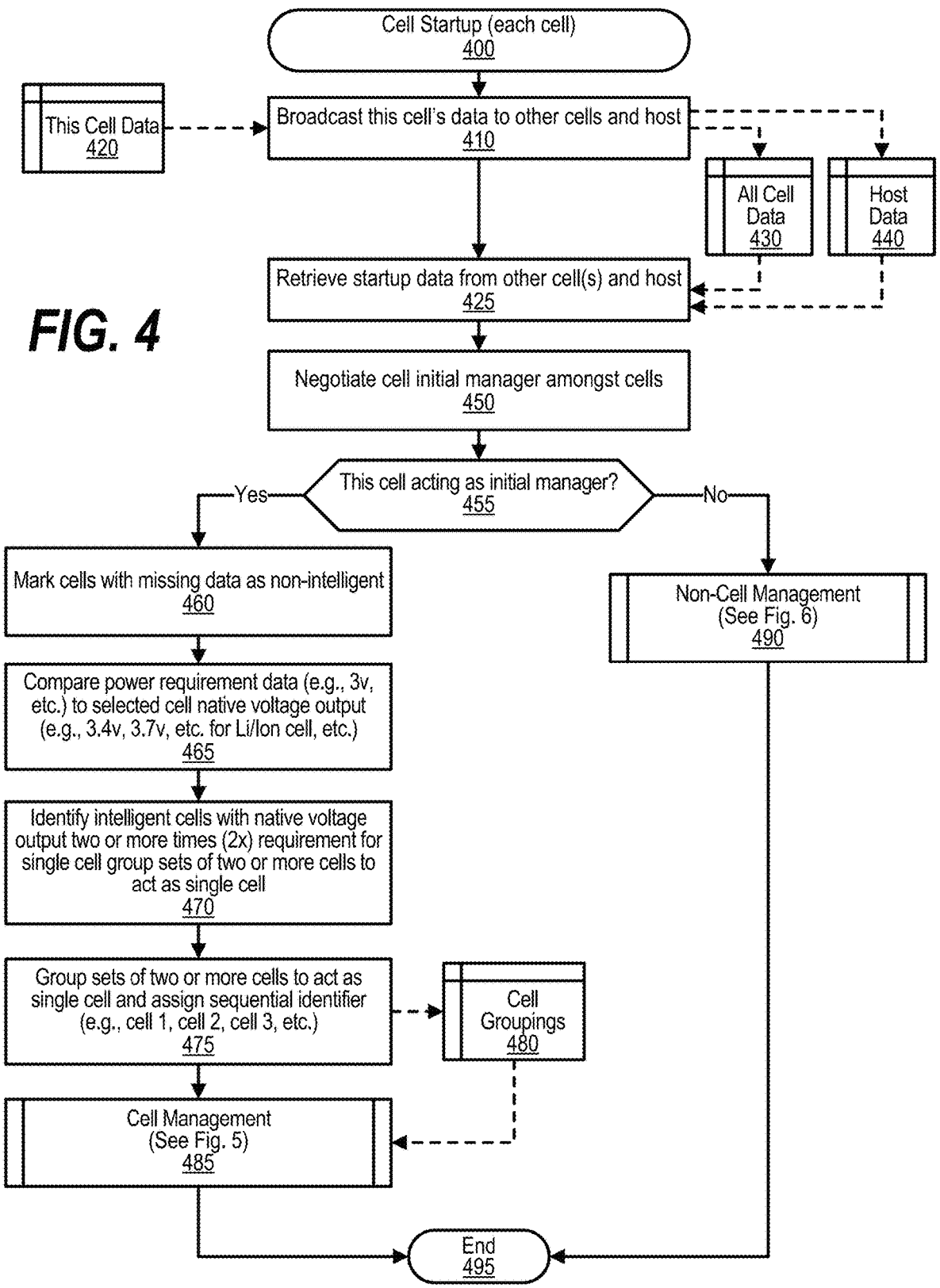
FIG. 4 is a flowchart showing steps performed during startup of the device.

FIG. 4 is a flowchart showing steps performed during startup of the device. FIG. 4 processing commences at 400 and shows the steps taken by a process that performs a battery cell startup routine. This routine is performed by each of the battery cells. At step 410, the process broadcasts this cell's data to other cells and host. Part of the data transmitted includes the cell's identifier (e.g., position in the battery pack, etc.) and the amount of power available at the cell. At step 425, the process retrieves startup data from the other cells. In addition, if the host (device) provides startup data, the cell also receives the host's startup data. At step 450, the process negotiates the initial cell manager amongst the set of cells being used to power the device. For example, a token can be used with the first cell to capture the token being the initial cell manager, or the cell that has the most available power can be the initial cell manager.

The process determines as to whether this cell is acting as the initial cell manager (decision 455). If this cell is acting as the initial cell manager, then decision 455 branches to the 'yes' branch to perform cell management functions 460 through 485. On the other hand, if this cell is not acting as the initial cell manager, then decision 455 branches to the 'no' branch whereupon, at predefined process 490, the process performs the Non-Cell Management routine (see FIG. 6 and corresponding text for processing details). The initial cell management steps are steps 460 through 475. Predefined process 485 (Cell Management) is performed by the initial cell manager as well as subsequent cell managers as explained in further detail below.

At step 460, the initial cell management process marks any cells that did not provide responsive data to the request in step 410 as non-intelligent battery cells, such as many traditional alkaline batteries. Unlike many traditional multi-cell configurations, the approach described herein allows a heterogenious mix of battery types, such as one or more lithium-based "smart" batteries with circuitry as shown in FIG. 3, as well as traditional batteries that do not have circuitry to communicate with other battery cells. At step 465, the process compares the power requirement data (e.g., 3 v, etc.) to the selected cells' native voltage output (e.g., 3.4 v, 3.7 v, etc. for Li/Ion cell, etc.). At step 470, the process identifies the intelligent battery cells with native voltage outputs that are two or more times (2×) requirement for single cell group sets of two or more cells to act as single cell. For example, if a cell requirement is 1.5 v and this battery's native output is 3.3 v or 3.7 v, then this battery cell is identified in step 470. At step 475, the process groups the battery cells into sets of two or more cells to act as a single battery cell and assigns a sequential identifier to each of the groups (e.g., cell 1, cell 2, cell 3, etc.). The groupings and their corresponding data is stored in memory area 480. At predefined process 485, the cell management process performs the Cell Management routine (see FIG. 5 and corresponding text for processing details). FIG. 4 processing thereafter ends at 495 (e.g. upon discharge of the battery cells or when the device is turned off, etc.).

Figure 5:
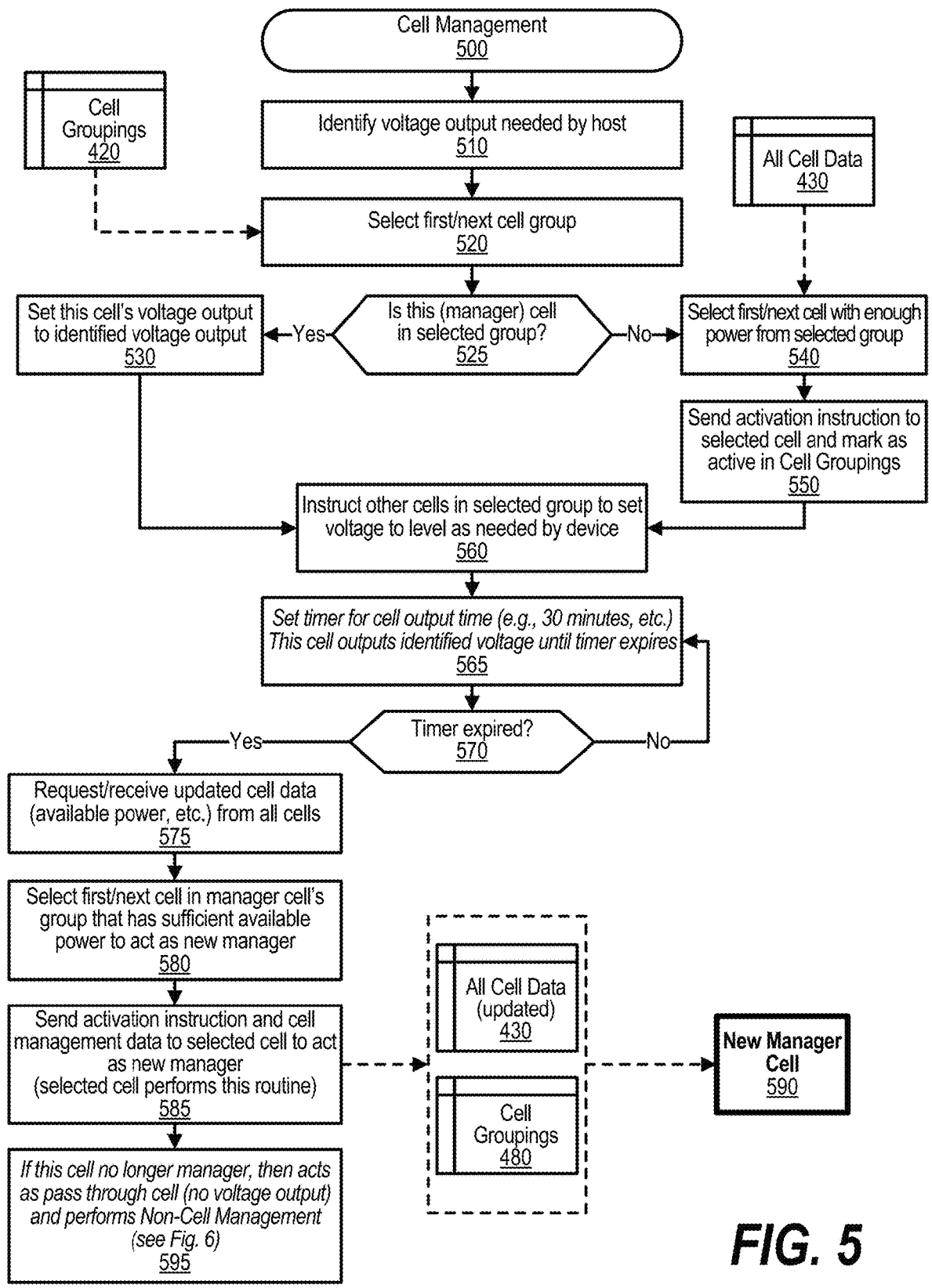
FIG. 5 is a flowchart showing steps performed to manage usage of the battery cells by a chosen cell manager.

FIG. 5 is a flowchart showing steps performed to manage usage of the battery cells by a chosen cell manager. FIG. 5 processing commences at 500 and shows the steps taken by a process that performs Cell Management by the battery cell that is acting as the manager. At step 510, the process identifies the amount voltage output needed by host to power the device (e.g., 3.0 v, etc.). At step 520, the process selects the first cell group from cell groupings 420. The cell groupings may be individual battery cells or groups of multiple cells that work together.

The process determines as to whether this (manager) cell is included in the selected group (decision 525). If this cell is included in the selected group, then decision 525 branches to the 'yes' branch to perform step 530 whereupon this cell's voltage output is set to the identified voltage output needed for an individual cell in the cell grouping (e.g., 1.5 v, 3.0 v, etc.). On the other hand, if this cell is not included in the selected group, then decision 525 branches to the 'no' branch to perform steps 540 and 550. At step 540, the process being performed by the current manager battery cell selects the first battery cell that has enough power (e.g., the most power in the group, etc.) from selected group of battery cells. The data pertaining to the cells in the group is retrieved from memory area 430.

At step 550, the process sends an activation instruction to the selected battery cells in the selected group and marks the selected battery cells as active in the cell groupings data that is stored in memory area 420. The activation instructions also include the voltage output instruction for each of the battery cells that are being activated in the selected group. At step 560, the process instructs the other cells not included in the selected group to shunt, or pass through (e.g., 0.0 v output, no voltage output). At step 565, the process sets a timer for cell output time (e.g., 30 minutes, etc.) This cell outputs identified voltage until timer expires. When this timer elapses, this routine is called again (by the new manager cell) and a different grouping of battery cells are used to provide power to the device, as set forth in FIG. 5. The process determines as to whether the timer has expired (decision 570).

When the timer expires, then the decision branches to the 'yes' branch to perform steps 575 through 595 that select a new manager cell to take the place of the current manager cell. Decision 570 continues to loop back to step 565 (the 'no' branch) until the timer has expired to continue powering the device using the selected set of battery cells from the selected group. Steps 575 through 595 are performed when the timer expires. At step 575, the cell manager process request and receives updated cell data (available power, etc.) from all of the cells. At step 580, the cell manager process selects the first cell in the cell manager group that has sufficient available power to act as the new manager. At step 585, the cell manager process sends an activation instruction and cell management data to the cell that was selected in step 580 to act as the new cell manager (new manager cell 590) with the selected battery cell now performing performs this routine shown in FIG. 5. Step 595, provides that if this battery cell is no longer acting as the cell manager, then this cell is shunted (0.0 v output) and now performs Non-Cell Management functions as shown in FIG. 6.

Figure 6:
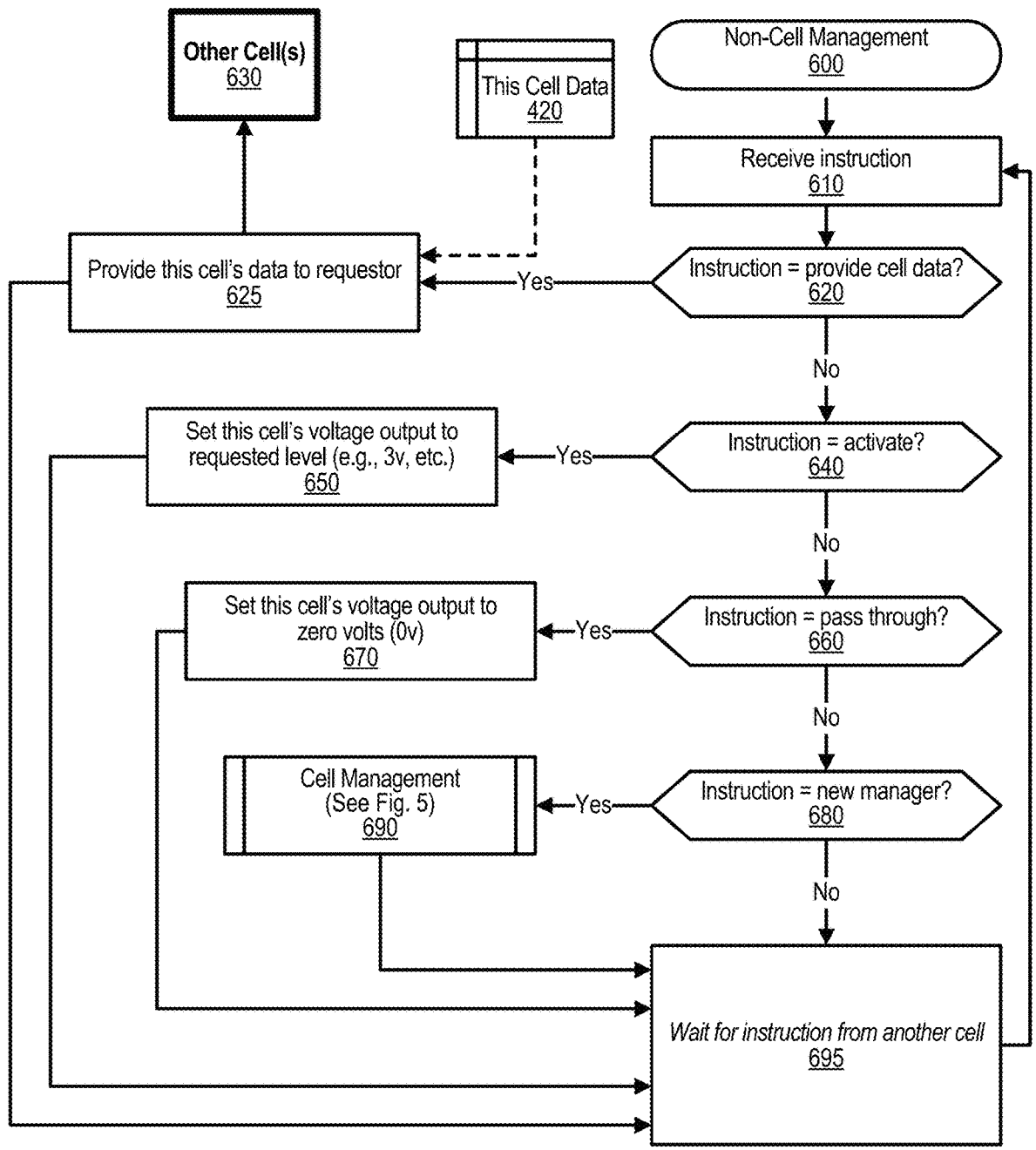
FIG. 6 is a flowchart showing steps performed by cells not currently acting as the cell manager.

FIG. 6 is a flowchart showing steps performed by cells not currently acting as the cell manager. FIG. 6 processing commences at 600 and shows the steps taken by a process that non-Cell Management. At step 610, this process, being performed by each of the non-management battery cells, receives an instruction from the host or from the battery cell currently acting as the manager. The process determines as to whether the instruction is an instruction to provide cell data (decision 620). If the instruction is an instruction to provide cell data, then decision 620 branches to the 'yes' branch whereupon at step 625, the process provides this cell's data to the requestor. On the other hand, if the instruction is not an instruction to provide cell data, then decision 620 branches to the 'no' branch and processing continues to determine which instruction was received.

The process determines as to whether the instruction is an instruction to activate the cell (decision 640). If the instruction is an instruction to activate the cell, then decision 640 branches to the 'yes' branch whereupon, at step 650, the process sets this cell's voltage output to requested level (e.g., 3.0 v, etc.). On the other hand, if the instruction is not an instruction to activate the cell, then decision 640 branches to the 'no' branch and processing continues to determine which instruction was received. The process determines as to whether the instruction is an instruction to shunt, or pass through (decision 660). If the instruction is an instruction to shunt, then decision 660 branches to the 'yes' branch whereupon, at step 670, the process sets this cell's voltage output to zero volts (0 v). On the other hand, if the instruction is not an instruction to shunt, then decision 660 branches to the 'no' branch and processing continues to determine which instruction was received.

The process next determines as to whether the instruction is an instruction for this cell to act as the new cell manager (decision 680). If the instruction is an instruction for this cell to act as the new cell manager, then decision 680 branches to the 'yes' branch whereupon, at predefined process 690, the process performs the Cell Management routine (see FIG. 5 and corresponding text for processing details). On the other hand, if the instruction is not an instruction for this cell to act as the new cell manager, then decision 680 branches to the 'no' branch bypassing step 690. At step 695, the process waits for a next instruction to be sent from another battery cell.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    determining that power from at least one battery cell in a multi-battery cell configuration is not required to power a device based on a power requirement of the device;
    regulating one or more voltages from the battery cells included in the multi-battery cell configuration, wherein a first set of one or more of the battery cells is shunted (0 v) and a second set of one or more of the battery cells is set to one or more voltage levels to satisfy the power requirement, wherein the regulating is performed by a selected one of the battery cells acting as a cell manager that manages usage of the multi-cell battery configuration, wherein the cell manager instructs the first set of battery cells to shunt and the second set of battery cells to regulate their voltages to a value determined by the cell manager; and
    after a period of time, selecting, by the cell manager, one of the battery cells to be a next cell manager.

2. The method of claim 1 wherein each of the battery cells is a lithium-based battery cell and wherein a native voltage of each of the battery cells is greater than three volts.

3. The method of claim 1 further comprising:
    shunting power from the cell manager; and
    setting the cell manager to the next cell manager to perform one or more cell manager functions.

4. The method of claim 1 further comprising:
    receiving, at a selected non-cell manager cell included in the multi-cell battery configuration, a request to set a voltage output from the selected non-cell manager cell to a value; and
    regulating, at the selected non-cell manager cell, a voltage output to the value.

5. The method of claim 1 further comprising:
    receiving, at a selected non-cell manager cell included in the multi-cell battery configuration, a request for cell data from a requestor; and transmitting a set of cell-related data to the requestor, wherein the set of cell-related data includes an available power value pertaining to the selected non-cell manager cell.

6. The method of claim 1 further comprising:
requesting a set of cell data from the battery cells in the multi-battery cell configuration, wherein the multi-battery cell configuration is a heterogeneous set of battery cell types;
receiving sets of cell data from a selected set one or more of the battery cells in the multi-battery cell configuration, wherein the selected set are intelligent cells with voltage-regulation capabilities;
establishing one or more groupings of the battery cells in the multi-battery cell configuration, wherein each of the groupings includes one or more battery cells, and wherein each of the groupings has sufficient power to satisfy the power requirement;
shunting power from a selected one or more of the groups; and
setting a voltage output from the battery cells in one or more non-selected groups so that the power from the battery cells in the combined non-selected groups matches the power requirement.

7. A battery-powered device comprising:
a plurality of battery cells that each include voltage regulator circuitry and communication circuitry;
logic that determines that power from at least one battery cell in a multi-battery cell configuration is not required to power a device based on a power requirement of the device;
regulating one or more voltages from the battery cells included in the multi-battery cell configuration, wherein a first set of one or more of the battery cells is shunted (0 v) and a second set of one or more of the battery cells is set to one or more voltage levels to satisfy the power requirement, wherein the regulating is performed by a selected one of the battery cells acting as a cell manager that manages usage of the multi-cell battery configuration, wherein the cell manager instructs the first set of battery cells to shunt and the second set of battery cells to regulate their voltages to a value determined by the cell manager; and
after a period of time, selecting, by the cell manager, one of the battery cells to be a next cell manager.

8. The device of claim 7 wherein each of the battery cells is a lithium-based battery cell and wherein a native voltage of each of the battery cells is greater than three volts.

9. The device of claim 7 further comprising:
logic that shunts power from the cell manager; and
logic that sets the cell manager to the next cell manager to perform one or more cell manager functions.

10. The device of claim 7 further comprising:
logic that receives, at a selected non-cell manager cell included in the multi-cell battery configuration, a request to set a voltage output from the selected non-cell manager cell to a value; and
logic that regulates, at the selected non-cell manager cell, a voltage output to the value.

11. The device of claim 7 further comprising:
logic that receives, at a selected non-cell manager cell included in the multi-cell battery configuration, a request for cell data from a requestor; and
logic that transmits a set of cell-related data to the requestor, wherein the set of cell-related data includes an available power value pertaining to the selected non-cell manager cell.

12. The device of claim 7 further comprising:
logic that requests a set of cell data from the battery cells in the multi-battery cell configuration, wherein the multi-battery cell configuration is a heterogeneous set of battery cell types;
logic that receives sets of cell data from a selected set one or more of the battery cells in the multi-battery cell configuration, wherein the selected set are intelligent cells with voltage-regulation capabilities;
logic that establishes one or more groupings of the battery cells in the multi-battery cell configuration, wherein each of the groupings includes one or more battery cells, and wherein each of the groupings has sufficient power to satisfy the power requirement;
logic that shunts power from a selected one or more of the groups; and
logic that sets a voltage output from the battery cells in one or more non-selected groups so that the power from the battery cells in the combined non-selected groups matches the power requirement.

13. A multi-battery configuration including a battery cell comprising:
voltage regulator circuitry;
communication circuitry;
logic that attempts to communicate with other battery cells using the communication circuitry;
logic that sets a voltage of the battery cell to a predefined voltage using the voltage regulator circuitry, wherein the predefined voltage is set in response to the attempt to communicate with the other battery cells fails;
logic that shunts power from a selected one of the other battery cells in response to determining that the power from the selected battery cell is not needed to provide an amount of power required by a device, wherein the communicating is performed by a selected one of the battery cells acting as a cell manager that manages usage of the battery cells, wherein the cell manager instructs the first set of battery cells to shunt and the second set of battery cells to regulate their voltages to a value determined by the cell manager; and
after a period of time, selecting, by the cell manager, one of the battery cells to be a next cell manager.

14. The multi-battery configuration of claim 13 wherein the battery cell is a lithium-based battery cell and wherein the predefined voltage is one and a half volts (1.5 v).

15. The multi-battery configuration of claim 13 wherein the battery cell is included in a multi-battery cell configuration that further comprises:
logic that determines that power from at least one battery cell in a multi-battery cell configuration is not required to power the device based on a power requirement of the device; and
logic that regulates one or more voltages from the battery cells included in the multi-battery cell configuration, wherein a first set of one or more of the battery cells is shunted (0 v) and a second set of one or more of the battery cells is set to one or more voltage levels to satisfy a power requirement.

16. The multi-battery configuration of claim 15 further comprising:
logic that selects the cell manager that manages usage of the multi-cell battery configuration, wherein the cell manager instructs the first set of battery cells to shunt and the second set of battery cells to regulate their voltages to a value determined by the cell manager.

17. The multi-battery configuration of claim 16 further comprising:

logic that shunts power from the cell manager; and logic that sets the cell manager to the next cell manager to perform one or more cell manager functions.

18. The multi-battery configuration of claim 15 further comprising:

logic that receives, at a selected non-cell manager cell included in the multi-cell battery configuration, a request to set a voltage output from the selected non-cell manager cell to a value; and logic that regulates, at the selected non-cell manager cell, a voltage output to the value.

19. The multi-battery configuration of claim 15 further comprising:

logic that receives, at a selected non-cell manager cell included in the multi-cell battery configuration, a request for cell data from a requestor; and logic that transmits a set of cell-related data to the requestor, wherein the set of cell-related data includes an available power value pertaining to the selected non-cell manager cell.

* * * * *